United States Patent [19]

Ohashi et al.

[11] Patent Number: 4,838,474
[45] Date of Patent: Jun. 13, 1989

[54] METHOD OF DIFFUSION BONDING OF ALUMINUM OR ALUMINA CERAMICS

[75] Inventors: Osamu Ohashi, Sayama; Ken Sasabe, Tokorozawa, both of Japan

[73] Assignee: National Research Institute for Metals, Tokyo, Japan

[21] Appl. No.: 163,724

[22] Filed: Mar. 3, 1988

[30] Foreign Application Priority Data

Mar. 6, 1987 [JP] Japan .................................. 62-50342

[51] Int. Cl.$^4$ .............................................. B23K 31/00
[52] U.S. Cl. ..................................... 228/121; 228/194; 228/263.7
[58] Field of Search ........... 228/194, 121, 122, 263.17, 228/263.11

[56] References Cited

U.S. PATENT DOCUMENTS 3,993,238 11/1976 Brook et al. ........................ 228/194
4,552,301 11/1985 Liehr et al. ......................... 228/194

FOREIGN PATENT DOCUMENTS 0121209 10/1984 European Pat. Off. ............ 228/194
0189967 8/1986 European Pat. Off. ....... 228/263.17
0041347 4/1981 Japan .............................. 228/263.17
0184574 11/1982 Japan ................................... 228/194
1071173 4/1986 Japan ............................. 228/263.17

Primary Examiner—Nicholas P. Godici
Assistant Examiner—Karen Skillman
Attorney, Agent, or Firm—Fitzpatrick, Cella, Harper & Scinto

[57] ABSTRACT

A method of diffusion bonding of aluminum or an alumina ceramic to aluminum, an alumina ceramic or a metal other than aluminum, which comprises interposing an aluminum alloy prepared by including 0.2 to 3% by weight of magnesium and/or 0.1 to 1.5% by weight of lithium into aluminum or an aluminum alloy between the surfaces of materials to be bonded, and heating said surfaces to be bonded of these materials under pressure at a temperature at which magnesium or lithium diffuses.

12 Claims, No Drawings

METHOD OF DIFFUSION BONDING OF ALUMINUM OR ALUMINA CERAMICS

This invention relates to a method of diffusion-bonding of aluminum or alumina ceramics. More specifically, this invention relates to a method of bonding aluminum materials to each other, alumina ceramics to each other, aluminumm to an alumina ceramic, or an alumina ceramic to a metal other than aluminum by diffusion under heat and pressure.

Diffusion bonding of aluminum is difficult because it has an oxide surface film. For removing the oxide film on the surface to be bonded, it has been the previous practice to treat the surface of aluminum to be bonded by a mechanical method such as rubbing or ultrasonic vibration, or an electrical method such as an bombardment of an argon ion, before it is subjected to diffusion bonding. The bond strength obtained by the prior art diffusion bonding, however, is not sufficient.

Bonding alumina ceramics to each other, or an alumina ceramic to a metal other than aluminum has previously been performed by using a soldering material such as titanium or copper. For diffusion bonding, a method is known in which a titanium foil or a titanium material on which TiC segregates during bonding is interposed between the surfaces to be bonded. Since, however, the soldering temperature or the bonding temperature in these methods is high, a great thermal stress occurs owing to the difference in thermal expansion coefficient between the bonding materials. Hence, cracking tends to occur in the bonded joint and the bpond strength is low.

The present invention has been accomplished in order to remove the above defect of the prior art, and its object is to provide a method of diffusion bonding of aluminum or alumina ceramics to provide a bonded joint having improved mechanical properties.

The present inventors have found that when an aluminum alloy obtained by including 0.2 to 3% by weight of magnesium or 0.1 to 1.5% by weight of lithium into aluminum or an aluminum alloy is interposed between materials to be bonded in the bonding of aluminum materials to each other, alumina ceramics to each other, aluminum to an alumina ceramics, or alumina to a metal other than aluminum, and the surfaces to be bonded are heated, magnesiunm or lithium diffuses over the bonding interface and reacts with alumina, for example, by reducing alumina or forming a complex oxide, and the resulting product gives a firm bond.

Thus, according to this invention, there is provided a method of diffusion bonding of aluminum or an alumina ceramic to aluminum, an alumina ceramic or a metal other than aluminum, which comprises interposing an aluminum alloy prepared by including 0.2 to 3% by weight of magnesium and/or 0.1 to 1.5% by weight of lithium into aluminum or an aluminum alloy between the surfaces of materials to be bonded, and heating said surfaces to be bonded of these materials under pressure at a temperature at which magnesium or lithium diffuses.

In the method of this invention, magnesium or lithium is included into aluminum or an aluminum alloy. The content of magnesium should be 0.2 to 3% by weight, and the content of lithium should be 0.1 to 1.5% by weight. When the contents of Mg or Li falls outside the above ranges, the bond strength of the resulting bonded joint decreases. An aluminum alloy containing both Mg and Li can be used in this invention as a bonding alloy.

Mg and/or Li may be included in an alloy of aluminum with another metal such as Cu, Mn, Si, Zn, Fe or Ti. The content of these other metals in the alloy is preferably not more than 6% by weight.

The method of this invention can be advantageously used to bond aluminum to aluminum, aluminum to an alumina ceramic, an alumina ceramic to an alumina ceramic, and an alumina ceramic to a metal other than aluminum, for example, iron, iron alloys, copper, copper alloys, titanium and titanium alloys.

In bonding, the aluminum alloy containing Mg and/or Li for bonding (to be referred to as the insert metal) is suitably interposed between the materials to be bonded, in the form of a plate having a thickness of 0.02 to 5 mm, preferably about 1 mm.

The heating temperature at the time of bonding is desirably the temperature at which magnesium or lithium diffuses, for example, at least 400° C. and below the melting point of the insert metal. The bonding pressure is preferably 0.1 to 3 kg/mm$^2$ and one under which the materials to be bonded are not greatly deformed. The bonding is carried out in a vacuum of $10^{-4}$ to $10^{-7}$ torr, or in an non-oxidizing atmosphere.

According to the method of this invention, diffusion bonding to provide a tensile strength of about 7 to 10 kg/mm$^2$ can be achieved. Bonding by the method of this invention does not require removal of an aluminum oxide film on the bonding surfaces, and it is only sufficient to remove oil components on them with organic solvents. Since the diffusion bonding in accordance with this invention can be carried out at lower temperatures than in the conventional soldering method, it is possible to prevent thermal degradation of the bonding materials and the occurrence of a thermal stress owing to the difference in thermal expansion between the bonding materials.

The present invention thus achieves strong diffusion bonded joint by a relatively simple operation at a relatively low cost.

The following examples illustrate the present invention specifically in more detail.

EXAMPLE 1

The end surfaces to be bonded of two round aluminum rods having a diameter of 12 mm were washed with acetone. An insert metal of aluminum containing 1% by weight of Mg and having a diameter of 12 mm and a thickness of 1 mm was interposed between the washed end surfaces. The surfaces to be bonded of the rods were heated at 600° C. for 30 minutes under a pressure of 0.3 kg/mm$^2$ in a vacuum of $10^{-5}$ torr. The bonded joint had a tensile strength of 8.5 kg/mm$^2$.

EXAMPLE 2

Example 1 was repeated except that an aluminum alloy containing 0.5% by weight of Li was used as the insert metal. The resulting bonded joint had a tensile strength of 8.0 kg/mm$^2$.

EXAMPLES 3-8 AND COMPARATIVE EXAMPLES 1-2

In each run, Example 1 was repeated except that each of the insert metals indicated in Table 1 was used. The tensile strength of the resulting bonded joint is shown in Table 1. Table 1 also shows the results obtained in Examples 1 and 2.

TABLE 1

| Run | Insert metal (% is by weight) | Tensile strength of the bonded joint (kg/mm²) |
|---|---|---|
| Comparative Example 1 | pure Al | 2 |
| Example 3 | Al—0.2% Mg | 4 |
| Example 4 | Al—0.5% Mg | 6 |
| Example 1 | Al—1% Mg | 8.5 |
| Example 5 | Al—2% Mg | 5.5 |
| Example 6 | Al—3% Mg | 4 |
| Example 7 | Al—0.1% Li | 5.0 |
| Example 2 | Al—0.5% Li | 8.0 |
| Example 8 | Al—1.5% Li | 5.5 |
| Comparative Example 2 | Al—3% Li | 1 |

As shown in Table 1, when the content of Mg in the insert metal was varied, the maximum tensile strength was obtained at 1% Mg, and tensile strengths higher than in the case of pure aluminum were obtained within an Mg content range of 0.2 to 3%. On the other hand, when the Li content of the insert metal was varied, the maximum tensile strength was obtained at 0.5% Li, and tensile strengths higher than in the case of pure aluminum were obtained within an Li content range of 0.1 to 1.5%.

EXAMPLES 9–10 AND COMPARATIVE EXAMPLES 3–6

In each run, Example 1 was repeated except that each of the insert metals indicated in Table 2 was used, and the bonding temperature was changed to 550° C. The tensile strength of the bonded joint is shown in Table 2.

TABLE 2

| Run | Insert metal (% is by weight) | Tensile strength of the bonded joint (kg/mm²) |
|---|---|---|
| Comparative Example 3 | pure Al | 0.1 |
| Comparative Example 4 | Al—1% Cu | 1.2 |
| Comparative Example 5 | Al—1% Mn | 1.5 |
| Comparative Example 6 | Al—1% Si | 1.5 |
| Example 9 | Al—1% Mg | 8.0 |
| Example 10 | Al—1% Li | 7.0 |

The results given in Table 2 show that when insert metals obtained by including Cu, Mn and Si respectively into aluminum were used, the tensile strength obtained showed some improvement over the case of using pure aluminum as the insert metal, but were not as high as in the case of using insert metals obtained by including Mg and Li into aluminum.

EXAMPLES 11–16

In each run, Example 1 was repeated except that each of the insert metals indicated in Table 3 was used, and the bonding temperature was changed to 550° C. The tensile strength of the resulting bonded joint is shown in Table 3.

TABLE 3

| Run | Insert metal (% is by weight) | Tensile strength of the bonded joint (kg/mm²) |
|---|---|---|
| Example 11 | Al—1% Cu—1% Mg | 9.5 |
| Example 12 | Al—1% Mn—1% Mg | 8.5 |
| Example 13 | Al—11% Si—1% Mg | 10.0 |
| Example 14 | Al—1% Cu—1% Li | 8.5 |
| Example 15 | Al—1% Mn—1% Li | 9.0 |
| Example 16 | Al—1% Si—1% Li | 8.7 |

Table 3 shows that even when aluminum alloys containing Cu, Mn and Si respectively are used as matrix metals of insert metals into which Mg and Li are to be included, high bond strengths can be obtained.

EXAMPLE 17

The end surfaces to be bonded of a round aluminum rod having a diameter of 12 mm and a round alumina rod having a diameter of 12 mm were washed with acetone, and an insert metal having a diameter of 12 mm and a thickness of 1 mm and obtained by including 1% by weight of Mg into aluminum was interposed between the washed end surfaces. The surfaces to be bonded were heated at 600° C. under a pressure of 0.3 kg/mm² for 30 minutes in a vacuum of $10^{-5}$ torr. The resulting bonded joint was subjected to a tensile test. Fracture occurred not in the bonded interface but in the alumina ceramics.

EXAMPLE 18

Example 17 was repeated except that an aluminum alloy obtained by including 1% by weight of Li into aluminum was used as the insert metal. In the tensile test, fracture occurred in the alumina ceramics.

EXAMPLES 19–20 AND COMPARATIVE EXAMPLE 7

In each run, Example 17 was repeated except that each of the insert metals indicated in Table 4 was used. The tensile strength of the bonded joint is shown in Table 4.

TABLE 4

| Run | Insert metal (% is by weight) | Tensile strength of the bonded joint (kg/mm²) |
|---|---|---|
| Comparative Example 7 | pure Al | 0.5 |
| Example 19 | Al—1% Mg | Fracture occurred in alumina ceramics |
| Example 20 | Al—2% Mg | Fracture occurred in alumina ceramics |

EXAMPLE 21 AND COMPARATIVE EXAMPLE 8

In each run, Example 17 was repeated except that each of the insert metals indicated in Table 5 was used. The tensile strength of the bonded joint is shown in Table 5.

TABLE 5

| Run | Insert metal (% is by weight) | Tensile strength of the bonded joint (kg/mm²) |
|---|---|---|
| Comparative Example 8 | Al—4.5% Cu—0.8% Mn—0.9% Si | 1.0 |
| Example 21 | Al—4.5% Cu—0.8% Mn—0.9% Si—1% Mg | Fracture occurred in alumina ceramics |

EXAMPLE 22

The end surfaces to be bonded of a round alumina rod having a diameter of 12 mm and a round copper rod having a diameter of 12 mm were washed with acetone, and an insert metal having a diameter of 12 mm and a thickness of 1 mm and obtained by including 1% by weight of Mg into aluminum was interposed between the washed end surfaces. The surfaces to be bonded were heated at 530° C. under a pressure of 0.3 kg/mm² for 30 minutes in a vacuum of $10^{-5}$ torr. The resulting bonded joint was subjected to a tensile test. Fracture occurred not in the bonded joint but in the alumina ceramics.

EXAMPLE 23

Example 22 was repeated exxcept that an aluminum alloy obtained by including 1% by weight of Li into aluminum was used as the insert metal. The resulting bonded joint was subjected to the tensile test. Fracture occurred in the alumina ceramics.

EXAMPLES 24–25

The end surfaces to be bonded of a round alumina rod having a diameter of 12 mm and a round titanium rod having a diameter of 12 mm were washed with acetone, and then an insert metal having a diameter of 12 mm and a thickness of 1 mm (shown in Table 6) was interposed between the washed end surfaces. The end surfaces to be bonded were heated at 550° C. under a pressure of 0.3 kg/mm² for 30 minutes under a vacuum of $10^{-5}$ torr. The resulting bonded joint was subjected to a tensile test. Fracture occurred in the alumina ceramics.

TABLE 6

| Example | Insert metal |
| --- | --- |
| 24 | Al—1% Mg |
| 25 | Al—1% Li |

What we claim:

1. A method of diffusion bonding aluminum or an alumina ceramic to aluminum, an alumina ceramic or a metal other than aluminum which comprises the steps of interposing an aluminum alloy comprising 0.1 to 1.5% by weight of lithium between the surfaces to be bonded and heating said surfaces under pressure to a temperature at which said lithium diffuses.

2. The method of claim 1 wherein said interposed aluminum alloy further contains at least one metal selected from the group consisting of Cu, Mn, Si, Zn, Fe and Ti.

3. The method of claim 1 wherein said metal other than aluminum is a metal selected from the group consisting of iron, iron alloys, copper, copper alloys, titanium and titanium alloys.

4. The method of claim 1 wherein said interposed aluminum alloy is in the form of a plate having a thickness of 0.02 to 5 mm.

5. The method of claim 1 wherein the heating temperature is at least 400° C. but below the melting point of the interposed aluminum alloy.

6. The method of claim 1 wherein the pressure is 0.1 to 3 kg/mm².

7. A method of diffusion bonding aluminum or an alumina ceramic to aluminum, an alumina ceramic or a metal other than aluminum which comprises the steps of interposing an aluminum alloy comprising 0.2 to 3 wt. % magnesium and 0.1 to 1.5 wt. % lithium between the surfaces to be bonded and heating said surfaces under pressure to a temperature at which at least one of said magnesium or lithium diffuses.

8. The method of claim 7, wherein said interposed aluminum alloy further comprises at least one metal selected from the group consisting of Cu, Mn, Si, Zn, Fe and Ti.

9. The method of claim 7, wherein said metal other than aluminum is a metal selected from the group consisting of iron, iron alloys, copper, copper alloys, titanium and titanium alloys.

10. The method of claim 7, wherein said interposed aluminum alloy is in the form of a plate having the thickness of 0.02 to 5 mm.

11. The method of claim 7, wherein the heating temperature is at least 400° C. but below the melting point of the interposed aluminum alloy.

12. The method of claim 7, wherein the pressure is 0.1 to 3 kg/mm².

* * * * *